(12) United States Patent
Kahler et al.

(10) Patent No.: US 8,964,035 B2
(45) Date of Patent: Feb. 24, 2015

(54) METHOD FOR CALIBRATING THE IMAGE OF A CAMERA

(75) Inventors: Peter Kahler, Vienna (AT); Christian Janner, Vienna (AT); Maike Löhndorf, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 380 days.

(21) Appl. No.: 12/773,059

(22) Filed: May 4, 2010

(65) Prior Publication Data

US 2010/0283856 A1  Nov. 11, 2010

(30) Foreign Application Priority Data

May 5, 2009 (EP) .................................. 09 450 093

(51) Int. Cl.
*G06K 9/00* (2006.01)
*H04N 17/00* (2006.01)
*G06T 7/00* (2006.01)

(52) U.S. Cl.
CPC ............ *H04N 17/002* (2013.01); *G06T 7/0018* (2013.01)
USPC ....................................................... 348/149

(58) Field of Classification Search
None
See application file for complete search history.

(56) References Cited

U.S. PATENT DOCUMENTS 5,734,337 A * 3/1998 Kupersmit ..................... 340/937
6,389,158 B1 * 5/2002 Pettersen et al. .............. 382/154
(Continued)

FOREIGN PATENT DOCUMENTS

DE 102005061931 A1 6/2007
DE 102007021107 A1 11/2007

OTHER PUBLICATIONS

XP 000572537, Baker, H.H. et al., Determining Scene Structure From a Moving Camera: Epipolar-Plane Image Analysis, pp. WB1-1 through WB1-4.
(Continued)

*Primary Examiner* — Scott Christensen
(74) *Attorney, Agent, or Firm* — Fiala & Weaver P.L.L.C.

(57) ABSTRACT

A method for calibrating the image ($3_I$, $3_{II}$) of a camera (1), and, in particular, a traffic-monitoring camera, with respect to its viewing space, such that the camera projection parameters ($m_{k1}$) of a camera projection of the viewing space onto the image are determined, includes the steps of providing a movable carrier (4) with at least four markings that can be viewed by the camera (1) and that span a volume and that form known first world points ($w_i$) in the viewing space, recording a first image ($3_I$) of the viewing space, shifting the carrier (4) in the viewing space by an unknown offset (v) in order to obtain second world points ($w_i$) dependent on this offset in the viewing space, recording a second image ($3_{II}$) of the viewing space, detecting the markings in the first image ($3_I$) as first image points ($p_i$) and in the second image ($3_{II}$) as second image points ($p_i$), and determining the camera projection parameters ($m_{k1}$), while also determining the offset (v), from the known first world points, the second world points dependent on the offset, the detected first image points, and the detected second image points.

16 Claims, 1 Drawing Sheet

(56) References Cited

U.S. PATENT DOCUMENTS

| | | | |
|---|---|---|---|
| 6,915,228 B2* | 7/2005 | Uffenkamp et al. | 702/94 |
| 8,379,926 B2* | 2/2013 | Kanhere et al. | 382/104 |
| 8,401,240 B2* | 3/2013 | Dixon et al. | 382/107 |
| 2006/0079205 A1* | 4/2006 | Semple et al. | 455/411 |
| 2008/0031514 A1* | 2/2008 | Kakinami | 382/154 |
| 2008/0186384 A1* | 8/2008 | Ishii et al. | 348/187 |
| 2008/0291278 A1* | 11/2008 | Zhang et al. | 348/159 |
| 2010/0208034 A1* | 8/2010 | Chen | 348/46 |

OTHER PUBLICATIONS

"Dynamic Camera Calibration of Roadside Traffic Management Cameras for Vehicle Speed Estimation", Schoepflin et al.; 1524-9050/03$17.00@2003 IEEE, pp. 90 98.

XP-002476596, Heikkila, J., "Geometric Camera Calibration Using Circular Control Points", IEEE Transactions on Pattern Analysis and Machine Intelligence, vol. 22, No. 10, Oct. 2000, pp. 1066-1077.

European Search Report dated Oct. 9, 2009 issued in priority application.

European Official Action dated Sep. 18, 2012 (European Patent Application No. 09 450 093.1).

Heikkila J: "Geometric Camera Calibration Using Circular Control Points".

Heikkila J: "A Four-step Camera Calibration Procedure with Implicit Image Correction"; 1997 IEEE; (7 pages).

* cited by examiner

METHOD FOR CALIBRATING THE IMAGE OF A CAMERA

FIELD OF THE INVENTION

The present invention relates to a method for calibrating the image of a camera, in particular a traffic-monitoring camera, with respect to its viewing space, in that the camera projection parameters of a projection of the viewing space onto the image are determined.

BACKGROUND OF THE INVENTION

Camera projections can be modeled in various ways, e.g., as a pinhole camera model, a "thick lens" or "thin lens" model, a fisheye lens model, etc., with and without consideration of lens errors and lens distortions. All of the models have in common that the projection can be described by so-called camera projection parameters that directly form, e.g., in simplified models, the coefficients of a geometric projection matrix.

The use of a direct linear transformation (DLT) for determining camera projection parameters has been known for a long time, as referenced, for example, in Abdel-Aziz, Y. I., and Karara, H. M.: "Direct Linear Transformation from Comparator Coordinates into Object Space Coordinates in Close-range Photogrammetry," Proceedings of the Symposium on Close-Range Photogrammetry, pp. 1-18, 1971, Falls Church, Va., American Society of Photogrammetry. For the use of DLT for determining camera projection parameters, the knowledge of at least six points spanning the space in the viewing space, so-called "world points," and their allocation to image points in the camera image are required. For this purpose, according to current prior art, at least six markings must be arranged distributed in the entire viewing space of the camera and then allocated to the correct image points in the camera image.

For traffic-monitoring cameras for underpasses or highways, wherein these cameras can have a large viewing field of up to several hundred meters, this means large time costs, because the individual markings must be placed, e.g., by hand on the street and measured relative to each other by means of laser-ranging meters or measuring chains. For this purpose, as a rule, a blockage of the tunnel or the section of the street is necessary, which is extremely obstructive: even for tunnel cameras, frequent recalibration of the monitoring cameras is necessary, because these can be moved during the regular washing of the tunnel or due to collisions with trucks driving past. The camera must also be recalibrated each time it is repaired or serviced.

SUMMARY OF THE INVENTION

The invention sets itself the goal of creating a method for calibrating camera images, wherein this method can be performed more easily and more quickly than previously known methods. This goal is achieved with a method of the type named above, with this method being distinguished by the steps of:

providing a movable carrier with at least four markings that can be viewed by the camera and that span a volume and that form known first world points in the viewing space, recording a first image of the viewing space, shifting the carrier in the viewing space by an unknown offset, in order to obtain second world points dependent on this offset in the viewing space, recording a second image of the viewing space, detecting the markings in the first image as first image points and in the second image as second image points, and determining the camera projection parameters, while also determining the offset, from the known first world points, the second world points dependent on the offset, the detected first image points, and the detected second image points.

With the help of the method according to the invention, it is no longer necessary to place and measure the six or more markings required for determining the camera projection parameters by hand in the viewing space. Instead, a movable carrier, e.g., a vehicle, with previously measured markings is used that is moved across the viewing field. In this way, it is not even necessary to know the extent of the movement in the real world, so that, for example, the velocity and direction of travel of the carrier can be selected largely arbitrarily.

The camera projection parameters determined in this way then allow a back allocation of the image coordinate system of the camera image to an arbitrarily selected plane in the world coordinate system of the viewing space, e.g., to a plane of the street, by means of which the goal of the calibration is achieved. From the camera image calibrated in this way, additional information can be derived at a later time, for example, the velocity and direction of travel of a vehicle on a street in the image.

Preferably, the mentioned determination takes place in a matrix model with the help of the method of direct linear transformation ("DLT"), in particular, preferably by solving the DLT equation $$D(s,t) \cdot m = p$$

with respect to m, s, and t, where

D(s,t) DLT matrix of all world points and image points in which the second world points are expressed by the first world points shifted by the offset (s,t,0), m Vector of the camera projection parameters, and p Vector of all image points.

This embodiment is suitable especially for traffic-monitoring cameras that monitor a plane of a street on which the carrier is shifted by a two-dimensional offset, so that the third coordinate of the offset can be assumed to be zero.

According to an especially advantageous embodiment of the invention, for solving the DLT equation, the minimization task $$\|D(s,t) \cdot m - p\| \to \min$$

is solved by means of the Gauss-Newton method. The Gauss-Newton method is known in mathematics, so that nothing more needs to be mentioned here on this method. The use of the Gauss-Newton method allows a quick solution of the DLT equation with sufficient precision.

For the basic functioning of the method, it is not absolutely necessary that all of the markings are detected in each image; it is sufficient that at least four markings are detected in one image and at least three markings are detected in the other image. From these 7 image points, 14 equations can be set up with which the 11 camera projection parameters of a simple pinhole camera projection model and up to 3 coordinates of the offset can be determined.

In each case, it is especially favorable when a vehicle is used as the carrier and a distance traveled by the vehicle is used as the offset. The method according to the invention is thus suitable especially for calibrating images of traffic-monitoring cameras, especially tunnel and highway cameras. The method of the invention can be performed during the operating times of the tunnel or the street and requires absolutely no measurement or closure means on the section of the street.

Preferably, distinctive points of the vehicle are selected as the markings or, in particular, lighting means are mounted on a rear carrier as well as a roof carrier or rearview-mirror carrier of the vehicle, so that conventional vehicles can be retrofitted for this accordingly.

It is especially advantageous when, according to another feature of the invention, more than two images are recorded, in order to detect additional image points of the markings that are included in the determination of the camera projection parameters, by means of which the precision of the method can be increased.

Another embodiment of the method of the invention is distinguished in that it is performed repeatedly and the determined camera projection parameters are averaged, by means of which the precision can be improved even more.

BRIEF DESCRIPTION OF THE DRAWINGS

The invention will be explained in detail below with reference to an embodiment shown in the accompanying drawings. Shown in the drawings are

FIG. 1 shows a camera 1 in whose viewing space there is a street 2 of which the camera 1 records at least two images $3_I$, $3_{II}$ (FIGS. 2a, 2b) in a time interval. For example, the camera 1 is a video camera with an image-repetition rate of, e.g., 25 fps (frames per second).

Figure 2B:
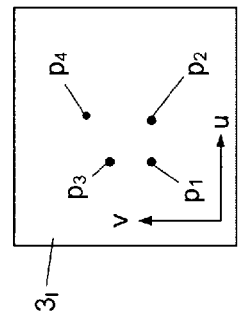
FIGS. 2a and 2b illustrate the images associated with the two positions of the vehicle for the traffic-monitoring camera of FIG. 1.
Figure 2A:
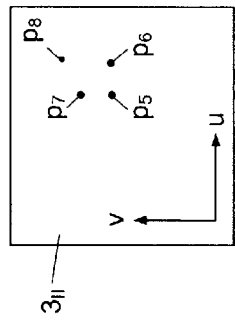
Figure 1:
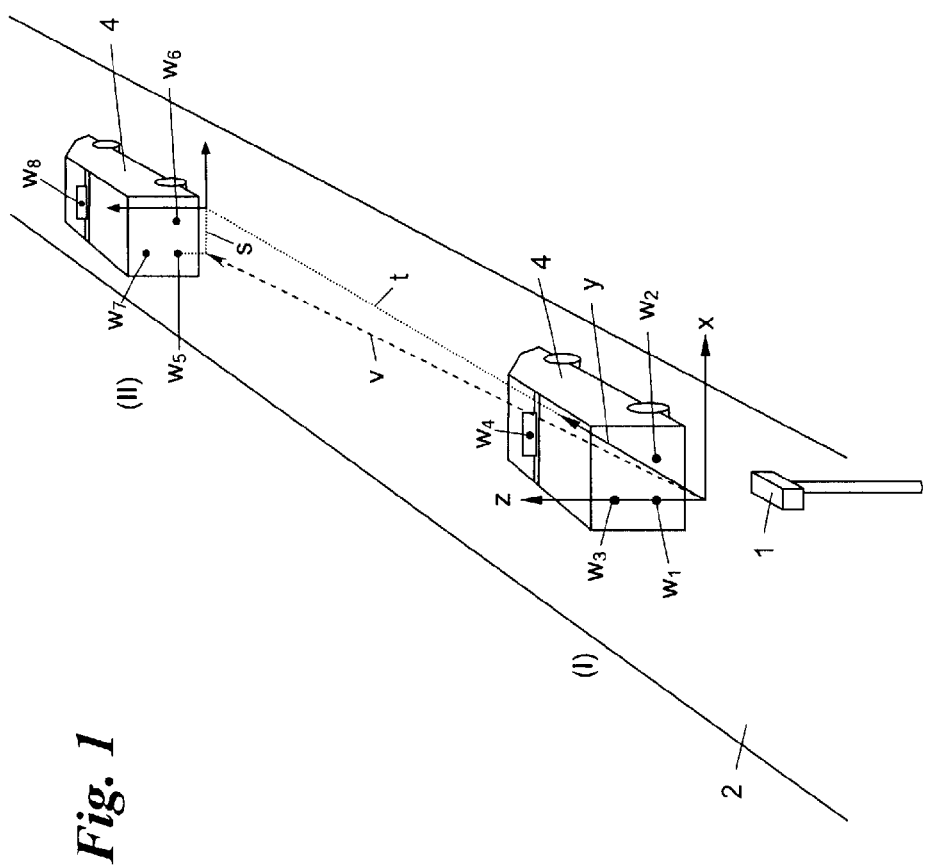
FIG. 1 illustrates the method of the invention with reference to second positions of a vehicle used as a marking carrier on a street.

A world-coordinate system (x, y, z) is allocated to the real objects (world points) in the viewing space of the camera 1 and an image-coordinate system u, v is allocated to the image points (pixels) of the two-dimensional camera images $3_I$, $3_{II}$.

The objects in the viewing space are arbitrary; example applications are the use of a camera 1 for monitoring waterways, public places, pedestrian zones, airports, taxiways and runways, parking spaces, buildings, entry and waiting areas, etc.

As known to those skilled in the art, the geometric projective imaging of world points $w_i$ can be modeled, e.g., as a perspective pinhole camera model with the coordinates $(x_i, y_i, z_i)$, e.g., the shown world points $w_1, w_2, \ldots w_8$, onto image points $p_i$ with the coordinates $(u_i, v_i)$, e.g., the shown image points $p_1, p_2, \ldots p_8$:

$$\begin{pmatrix} \sigma u_i \\ \sigma v_i \\ \sigma \end{pmatrix} = \begin{pmatrix} m_{11} & m_{12} & m_{13} & m_{14} \\ m_{21} & m_{22} & m_{23} & m_{24} \\ m_{31} & m_{32} & m_{33} & 1 \end{pmatrix} \cdot \begin{pmatrix} x_i \\ y_i \\ z_i \\ 1 \end{pmatrix} \quad (1)$$

or for short $$p_i = M \cdot w_i \quad (2)$$

The matrix M is also designated as the camera projection matrix of the selected camera model and its coefficients $m_{kl}$ are also designated as camera projection parameters. If other camera models are used as the pinhole camera model described here in detail, e.g., the "thick-lens" or "thin-lens" or fisheye or other camera models, with and without consideration of lens errors and lens distortions, the camera projection can then also be modeled by several and/or different camera projection parameters not necessarily forming only one such matrix.

If the precise position of the camera 1 and all of its internal parameters, such as, focal length, sensor size, etc., are known, the parameters of the camera projection, here, the matrix M, may be constructed directly. The goal of the camera calibration is to determine the camera projection parameters, here the matrix M, without this knowledge. In the present example, the 11 coefficients $m_{11}, m_{12}, \ldots m_{33}$ are to be determined.

Under the assumption that at least six allocations of world points $w_i$ to image points $p_i$ are known, the 11 camera projection parameters $m_{11}, m_{12} \ldots m_{33}$ of the matrix M are determined as parameters of a direct linear transformation (DLT) according to the following DLT equation (here set up for eight allocations; the purpose for this will become clear later):

$$\begin{pmatrix} x_1 & y_1 & z_1 & 1 & 0 & 0 & 0 & 0 & -u_1x_1 & -u_1y_1 & -u_1z_1 \\ 0 & 0 & 0 & 0 & x_1 & y_1 & z_1 & 1 & -v_1x_1 & -v_1y_1 & -v_1z_1 \\ x_2 & y_2 & z_2 & 1 & 0 & 0 & 0 & 0 & -u_2x_2 & -u_2y_2 & -u_2z_2 \\ 0 & 0 & 0 & 0 & x_2 & y_2 & z_2 & 1 & -v_2x_2 & -v_2y_2 & -v_2z_2 \\ \vdots & \vdots & \vdots & \vdots & \vdots & \vdots & \vdots & \vdots & \vdots & \vdots & \vdots \\ x_8 & y_8 & z_8 & 1 & 0 & 0 & 0 & 0 & -u_8x_8 & -u_8y_8 & -u_8z_8 \\ 0 & 0 & 0 & 0 & x_8 & y_8 & z_8 & 1 & -v_8x_8 & -v_8y_8 & -v_8z_8 \end{pmatrix} \begin{pmatrix} m_{11} \\ m_{12} \\ m_{13} \\ m_{14} \\ m_{21} \\ \vdots \\ m_{33} \end{pmatrix} = \begin{pmatrix} u_1 \\ v_1 \\ u_2 \\ v_2 \\ \vdots \\ u_8 \\ v_8 \end{pmatrix} \quad (3)$$

or for short $$D \cdot m = p \quad (4)$$

In a first step, a movable carrier 4 is now provided with at least four markings or first world points $w_1, w_2, w_3, w_4$ that can be viewed by the camera 1 in the viewing space of the camera 1, in the shown example, a vehicle. The world points $w_1, w_2, w_3, w_4$ are selected so that they span a volume and their position in the world-coordinate system x, y, z is known.

In a first position I of the carrier 4, the camera 1 records a first image $3_I$. In the image $3_I$, the image points $p_1, p_2, p_3, p_4$ of the four markings or world points $w_1, w_2, w_3, w_4$ are detected immediately or at a later time, manually or with the help of conventional image-recognition methods.

Then the carrier 4 is shifted by an offset v(s,t,0) in the viewing space of the camera 1, e.g., the vehicle moves forward by a distance traveled. In this second position II, an image $3_{II}$ is recorded again and in this image the new image points $p_5, p_6, p_7, p_8$ of the original markings or world points $w_1, w_2, w_3, w_4$ shifted to the new world points $w_5, w_6, w_7, w_8$ are detected.

Therefore, to solve equation (3), the new or second world points $w_5, w_6, w_7, w_8$ can be expressed by the offset v(s,t,0) of the old or first four world points $w_1, w_2, w_3, w_4$ as:

$$(x_5, y_5, z_5) = (x_1 + s, y_1 + t, z_1) \quad (5)$$

$$(x_6, y_6, z_6) = (x_2 + s, y_2 + t, z_2) \quad (6)$$

$$(x_7, y_7, z_7) = (x_3 + s, y_3 + t, z_3) \quad (7)$$

$$(x_8, y_8, z_8) = (x_4 + s, y_4 + t, z_4) \quad (8)$$

As is clear, in the shown example, an offset v parallel to the x/y plane of the selected world-coordinate system was assumed, under the assumption that the carrier 4 is a vehicle that moves with a constant z distance to the plane of the street 2 and the world-coordinate system x, y, z was set accordingly. If desired, however, a three-dimensional offset v may also be used.

Therefore, in equation (3) or (4), in the last eight rows of the matrix D, the world points $w_5, w_6, w_7, w_8$ can be expressed by the world points $w_1, w_2, w_3, w_4$ and the offset parameters s, t, and we name this the modified matrix D(s,t).

Equation (3) or (4) now has 13 unknowns: 11 camera projection parameters $m_{k1}$ of the camera projection matrix M and 2 offset parameters s, t. The DLT equation (3) or (4) thus becomes the new DLT equation $$D(s,t) \cdot m = p \qquad (9)$$

Equation (9) can then be solved as a minimization task of the form $$\|D(s,t)m-p\| \to \min \qquad (10)$$

In the minimization task, we search $m_{11}, m_{12}, \ldots m_{33}$ as well as s and t so that the standard $\|D(s,t)m-p\|$ becomes a minimum.

For this purpose, in principle, any method known in the prior art is suitable; preferably, the minimization task (10) is solved with the help of the Gauss-Newton method.

As a result, in this way—while simultaneously also determining the offset v—the camera projection parameters $m_{k1}$ of the camera projection matrix of the pinhole model equation (1) is determined. Consequently, each arbitrary world point can be allocated to an image point or vice versa, each image point can be allocated to a world point in a selected plane of the viewing space, e.g., a point on the street 2. Therefore, for example, the location and velocity of vehicles 4 on the street 2 can be measured from the camera images $3_I, 3_{II}$.

Because the DLT equation (9) or minimization task (10) has merely 13 unknowns (if a two-dimensional offset v is assumed) or 14 unknowns (if a three-dimensional offset v is assumed), seven world-point-to-image-point allocations $w_i \leftrightarrow p_i$ are sufficient for solving the equation. Therefore, in the simplest case, four image points are detected in one image and only three image points are detected in the other image; each additional increase in the number of detected allocations $w_i \leftrightarrow p_i$, e.g., by drawing on additional camera images for more than two positions I, II of the carrier 4 and/or through the use of more than four markings on the carrier 4, can be used for improving the precision of the solution. It is also possible to repeat the method, in order to stabilize the camera projection parameters determined in the individual runs through averaging.

The invention is not limited to the shown embodiment, but instead comprises all variants and modifications that fall within the scope of the associated claims.

What is claimed is:

1. A method for calibrating an image of a stationary camera with respect to a viewing space of the camera, comprising:
   providing a movable carrier with at least four markings thereon that can be viewed by the stationary camera and that span a volume, the markings forming known first world points in the viewing space;
   recording a first image of the markings on the movable carrier in a first position in the viewing space;
   shifting the carrier with the at least four markings thereon to a second position in the viewing space by an unknown offset, the markings forming second world points which are dependent on this offset in the viewing space;
   recording a second image of the markings on the movable carrier in the second position in the viewing space;
   detecting the markings in the first image as first image points and in the second image as second image points;
   determining the offset and camera projection parameters, which define a projection of world points in the viewing space onto image points in the image, from the known first world points, the second world points dependent on the offset, the detected first image points, and the detected second image points; and
   calibrating the image of the camera using said camera projection parameters;
   wherein the step of determining the camera projection parameters is performed using a direct linear transformation ("DLT") method; and
   wherein the step of determining the camera projection parameters is performed by solving a DLT equation $$D(s,t) \cdot m = p$$

with respect to m, s, and t, wherein;
   D(s,t) is a DLT matrix of all world points and image points in which the second world points are expressed by the first world points shifted by the offset (s,t,0);
   m is a vector of the camera projection parameters; and
   p is a vector of all image points.

2. The method according to claim 1, wherein in order to solve the DLT equation, the minimization task $$\|D(s,t) \cdot m - p\| \to \min$$

is solved by means of a Gauss-Newton method.

3. The method according to claim 1, wherein at least four markings are detected in one image and at least three markings are detected in the other image.

4. The method according to claim 1, wherein more than two images are recorded in order to detect additional image points of the markings that are included in the determination of the camera projection parameters.

5. The method according to claim 1, wherein a vehicle is used as the carrier and a driven distance of the vehicle is used as the offset.

6. The method according to claim 5, wherein distinctive points of the vehicle are used as the markings.

7. The method according to claim 5, wherein lighting means are mounted on a rear carrier, a roof carrier and/or a rearview-mirror carrier of the vehicle as markings.

8. The method according to claim 1, wherein the method is repeated and the determined camera projection parameters are averaged.

9. A method for calibrating an image of a camera with respect to its viewing space, such that camera projection parameters of a camera projection of the viewing space onto the image are determined, comprising the steps of:
   providing a movable carrier with at least four markings that can be viewed by the camera and that span a volume and form known first world points in the viewing space;
   recording a first image of the viewing space;
   shifting the carrier in the viewing space by an unknown offset in order to obtain second world points dependent on this offset in the viewing space;
   recording a second image of the viewing space;
   detecting the markings in the first image as first image points and in the second image as second image points; and
   determining the camera projection parameters, while also determining the offset, from the known first world points, the second world points dependent on the offset, the detected first image points, and the detected second image points, wherein the determining step is performed by solving a DLT equation $$D(s,t) \cdot m = p$$

with respect to m, s, and t, wherein;
D(s,t) is a DLT matrix of all world points and image points in which the second world points are expressed by the first world points shifted by the offset (s,t,0);
m is a vector of the camera projection parameters; and
p is a vector of all image points.

10. The method according to claim 9, wherein in order to solve the DLT equation, the minimization task $$\|D(s,t) \cdot m - p\| \to \min$$

is solved by means of a Gauss-Newton method.

11. The method according to claim 9, wherein at least four markings are detected in one image and at least three markings are detected in the other image.

12. The method according to claim 9, wherein more than two images are recorded in order to detect additional image points of the markings that are included in the determination of the camera projection parameters.

13. The method according to claim 9, wherein a vehicle is used as the carrier and a driven distance of the vehicle is used as the offset.

14. The method according to claim 13, wherein distinctive points of the vehicle are used as the markings.

15. The method according to claim 13, wherein lighting means are mounted on a rear carrier, a roof carrier and/or a rearview-mirror carrier of the vehicle as markings.

16. The method according to claim 9, wherein the method is repeated and the determined camera projection parameters are averaged.

* * * * *